(12) United States Patent  (10) Patent No.: US 9,693,618 B2
Shasteen et al.  (45) Date of Patent: Jul. 4, 2017

(54) CUSTOMIZABLE COSMETIC CONTAINERS, SYSTEMS, AND METHODS

(75) Inventors: Rhonda L. Shasteen, Lucas, TX (US); Karola Sajuns, Frisco, TX (US)

(73) Assignee: Mary Kay Inc., Addison, TX (US)

( * ) Notice: Subject to any disclaimer, the term of this patent is extended or adjusted under 35 U.S.C. 154(b) by 1400 days.

(21) Appl. No.: 13/376,360

(22) PCT Filed: Jun. 1, 2010

(86) PCT No.: PCT/US2010/036915
§ 371 (c)(1),
(2), (4) Date: Feb. 16, 2012

(87) PCT Pub. No.: WO2010/141479
PCT Pub. Date: Dec. 9, 2010

(65) Prior Publication Data
US 2012/0136748 A1   May 31, 2012

Related U.S. Application Data

(60) Provisional application No. 61/182,929, filed on Jun. 1, 2009, provisional application No. 61/185,526, filed on Jun. 9, 2009.

(51) Int. Cl.
*G06Q 30/00* (2012.01)
*A45D 33/18* (2006.01)
*A45D 40/22* (2006.01)
*G06Q 30/06* (2012.01)
(Continued)

(52) U.S. Cl.
CPC ........... *A45D 33/18* (2013.01); *A45D 40/221* (2013.01); *G06Q 30/0621* (2013.01);
(Continued)

(58) Field of Classification Search
CPC ................... G06Q 30/0601–30/0645
(Continued)

(56) References Cited

U.S. PATENT DOCUMENTS 6,412,640 B1 * 7/2002 Destanque ............. A45D 33/28
132/297
6,520,543 B1 * 2/2003 Hoar ....................... G09F 23/08
283/67

(Continued)

OTHER PUBLICATIONS

Oser, K. (2000). P&G goes one-to-one. Catalog Age, , 103. Retrieved from https://search.proquest.com/docview/200723384?accountid=14753.*
PCT International Search Report and Written Opinion issued in International application No. PCT/US2010/036915, dated Oct. 5, 2010.

*Primary Examiner* — Resha Desai
(74) *Attorney, Agent, or Firm* — Norton Rose Fulbright US LLP

(57) ABSTRACT

Customizable cosmetic containers, customization components, kits, and methods In one embodiment a kit is disclosed comprising a cosmetic container comprising a body, the body defining a cavity configured to receive a cosmetic product, and the body configured to be coupled to a lid in a closed position such that the body and the lid cooperate to substantially enclose the cavity and two or more customization components each configured to be connected to at least one of the body and a lid such that at least a portion of the customization component contours to the shape of a surface of the at least one of the body and lid.

8 Claims, 17 Drawing Sheets

(51) Int. Cl.
  *A45D 33/00* (2006.01)
  *A45D 40/06* (2006.01)
  *A45D 44/00* (2006.01)
  *A45D 34/00* (2006.01)
  *A45D 40/00* (2006.01)

(52) U.S. Cl.
  CPC ............ *A45D 33/008* (2013.01); *A45D 40/06* (2013.01); *A45D 44/005* (2013.01); *A45D 2034/007* (2013.01); *A45D 2040/0012* (2013.01)

(58) Field of Classification Search
  USPC ................ 705/26.1–27.2; 132/293; 220/375; 340/691.2; 206/581
  See application file for complete search history.

(56) References Cited

U.S. PATENT DOCUMENTS

| | | | |
|---|---|---|---|
| 2003/0183240 A1* | 10/2003 | Manougian | A45D 40/22 132/295 |
| 2008/0078824 A1 | 4/2008 | Spriegel et al. | 229/403 |
| 2008/0233326 A1* | 9/2008 | Hegemier | H04M 1/0283 428/41.7 |
| 2008/0248247 A1* | 10/2008 | Caine | G06F 3/016 428/152 |
| 2010/0235258 A1* | 9/2010 | Langvin | A43B 5/001 705/26.1 |
| 2012/0100327 A1* | 4/2012 | Hegemier | H04M 1/0283 428/41.8 |

* cited by examiner

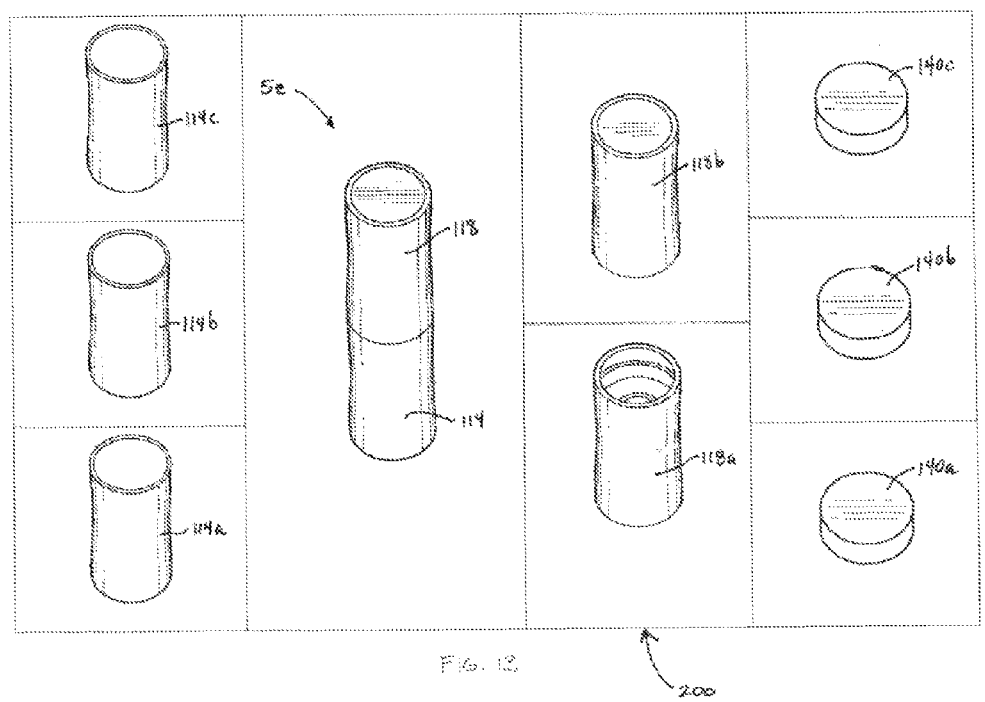

CUSTOMIZABLE COSMETIC CONTAINERS, SYSTEMS, AND METHODS

CROSS REFERENCE TO RELATED APPLICATIONS

This application is a national phase application under 35 U.S.C. §371 of International Application No. PCT/US2010/036915, filed Jun. 1, 2010, which claims the benefit of U.S. Provisional Application No. 61/182,929, filed Jun. 1, 2009, and U.S. Provisional No. 61/182,526 filed Jun. 9, 2009. The contents of the referenced applications are incorporated by reference.

BACKGROUND OF THE INVENTION

The present invention relates generally to cosmetic containers, and more particularly, but not by way of limitation, customizable cosmetic containers, customization components, kits, and methods for customizable cosmetic containers.

The sale of cosmetics is a world-wide business that is highly competitive and in which any marketing advantage or method of distinguishing one's products is sought. Additionally, protective or scratch-resistant devices and coverings may be useful for cosmetic containers. Various cosmetic containers are known in the art, and may include, for example: compacts, lipsticks, mascara holders, tubes, bottles, applicator bottles, powder boxes, and the like.

SUMMARY

The present invention relates generally to cosmetic containers; customization components configured to be coupled to cosmetic containers; kits comprising cosmetic containers and customization components; and methods of using, packaging, manufacturing, and/or distributing cosmetic containers, customization components, and/or kits.

Some embodiments of the present kits comprise: a cosmetic container comprising a body, the body defining a cavity configured to receive a cosmetic product, and the body configured to be coupled to a lid in a closed position such that the body and the lid cooperate to substantially enclose the cavity; and two or more customization components each configured to be connected to at least one of the body and lid such that at least a portion of the customization component contours to the shape of a surface of the at least one of the body and lid.

In some embodiments, the cosmetic container further comprises a lid. In some embodiments, at least one of the customization components is a lid configured to be coupled to the body. In some embodiments, two or more of the two or more customization components are different lids that are each configured to be coupled to the body.

In some embodiments, the cosmetic container is selected from the group consisting of: compacts, lipstick containers, mascara containers, tubes, bottles, applicator bottles, powder boxes, nail polish bottles, and cosmetic pencil containers. In some embodiments, at least one of the customization components is selected from the group consisting of: skins, interchangeable lids, cover shells, labels, coatings, inserts, adhesive stickers, and static-cling stickers.

In some embodiments, the cosmetic container is a compact comprising a lid pivotally connected to the body, the cavity of the body having a plurality of subcavities, and at least one of the customization components configured to fit within one or more subcavities.

In some embodiments, the cosmetic container comprises a body and a lid, at least one customization component is a cover shell configured to fit over and substantially cover a portion of at least one of the body and lid, and the cover shell is configured to substantially retain its shape in the absence of an external force. In some embodiments, the cover shell is substantially rigid. In some embodiments, the customization components include two or more cover shells.

In some embodiments, the two or more customization components are configured to be removably coupled to the cosmetic container. In some embodiments, the cosmetic container is a compact, and where the two or more customization components comprise three or more interchangeable customization components. In some embodiments, the cosmetic container is a lipstick container, and where the two or more customization components comprise three or more interchangeable customization components.

Some embodiments of the present kits comprise: a cosmetic container comprising a body and a lid, the body defining a cavity configured to receive a cosmetic product, the lid configured to be coupled to the body such in a closed position in which the body and the lid cooperate to substantially enclose the cavity; and a customization skin comprising a resilient, flexible material, the customization skin configured to be removably coupled to at least one of the body and the lid of the cosmetic container such that the customization skin fits over and around a portion of the at least one of the body and lid and remains coupled to the at least one of the body and the lid without adhesive.

In some embodiments, the cosmetic container is a compact, where the lid is pivotally connected to the body such that the lid can pivot relative to the body between the closed position and an open position in which the cavity is accessible by a user. In some embodiments, the customization skin is configured to be removably coupled to both of the lid and the body. In some embodiments, the customization skin is configured to be removably coupled to both of the lid and the body such that the customization skin does not interfere with pivoting the lid relative to the body. In some embodiments, the compact comprises a hinge portion projecting from a top surface of the compact, and where the customization skin includes a cutout to permit the hinge portion to extend through the customization skin.

In some embodiments, the customization skin comprises silicone. Some embodiments comprise a plurality of the customization skins.

In some embodiments, the cosmetic container comprises a lipstick container. In some embodiments, the customization skin comprises a tube with two open ends. In some embodiments, the customization skin comprises a tube with a closed end and an open end. In some embodiments, the customization skin is configured to be coupled to the lid of the lipstick container.

In some embodiments, the cosmetic container is selected from the group consisting of: mascara containers, tubes, bottles, applicator bottles, powder boxes, nail polish bottles, and cosmetic pencil containers. In some embodiments, the cosmetic container is a compact, and where the customization skin comprises three or more interchangeable customization skins. In some embodiments, the cosmetic container is a lipstick container, and where the customization skin comprises three or more interchangeable customization skins.

Some embodiments of the present kits comprise: a cosmetic container comprising a body and a lid, the body defining a cavity configured to receive a cosmetic product, the lid configured to be coupled to the body such in a closed position in which the body and the lid cooperate to substantially enclose the cavity; and three or more interchangeable customization skins each comprising a resilient, flexible material, each customization skin configured to be removably coupled to at least one of the body and the lid of the cosmetic container such that the customization skin fits over and around a portion of the at least one of the body and lid and remains coupled to the at least one of the body and the lid without adhesive.

Some embodiments of the present methods comprise: providing a kit having one or more cosmetic containers and one or more customization components (e.g., customization skins); selecting a customization component or a customization skin; and coupling the selected customization component or customization skin to at least one of the lid and body of the cosmetic container.

Some embodiments of the present methods for distributing a customizable cosmetic container over the internet, comprise: displaying via a user display at least one image of a cosmetic container comprising a body, the body defining a cavity configured to receive a cosmetic product, and the body configured to be coupled to a lid in a closed position such that the body and the lid cooperate to substantially enclose the cavity; displaying via a user display at least one image of each of two or more customization components, each customization component configured to be connected to at least one of the body and a lid such that at least a portion of the customization component contours to the shape of a surface of the at least one of the body and lid; receiving from a user one or more selection inputs each corresponding to a selected one of the two or more customization components; and shipping the cosmetic container and the one or more selected customization components to an address designated by the user.

In some embodiments, the cosmetic container includes a cosmetic disposed within the cavity. In some embodiments, displaying via a user display at least one image of a cosmetic container comprises displaying at least one image of each of two or more cosmetic containers. Some embodiments further comprise: receiving one or more selection inputs each correspond to a selected one of the two or more cosmetic containers; where shipping the cosmetic container comprises shipping the one or more selected cosmetic containers and the one or more selected customization components. Some embodiments further comprise: coupling a selected customization component to each cosmetic container prior to shipping. In some embodiments, coupling comprises permanently coupling a selected customization component to at least one cosmetic container.

Some embodiments of the present methods for ordering a customizable cosmetic container over the internet, comprise: accessing a website via user device having a user display and an input portion; viewing via the user display at least one image of a cosmetic container comprising a body, the body defining a cavity configured to receive a cosmetic product, and the body configured to be coupled to a lid in a closed position such that the body and the lid cooperate to substantially enclose the cavity; viewing via the user display at least one image of each of two or more customization components, each customization component configured to be connected to at least one of the body and a lid such that at least a portion of the customization component contours to the shape of a surface of the at least one of the body and lid; entering via the input portion one or more selection inputs each corresponding to a selected one of the two or more customization components; and ordering the cosmetic container and the one or more selected customization components for shipment to an address.

In some embodiments, the cosmetic container includes a cosmetic disposed within the cavity. In some embodiments, viewing via a user display at least one image of a cosmetic container comprises viewing at least one image of each of two or more cosmetic containers. Some embodiments further comprise: entering via the input portion one or more selection inputs each corresponding to a selected one of the two or more customization components; where ordering the cosmetic container comprises ordering the one or more selected cosmetic containers and the one or more selected customization components.

Also contemplated are design-based applications directed towards the customizable components disclosed throughout this specification and figures.

Any embodiment of any of the present cosmetic containers, customization components, kits, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 13 depicts an diagram view of a webpage for certain embodiments of the present methods of distributing and ordering the present kits, cosmetic containers, and/or customization components.

DESCRIPTION OF ILLUSTRATIVE EMBODIMENTS

Figure 1B:
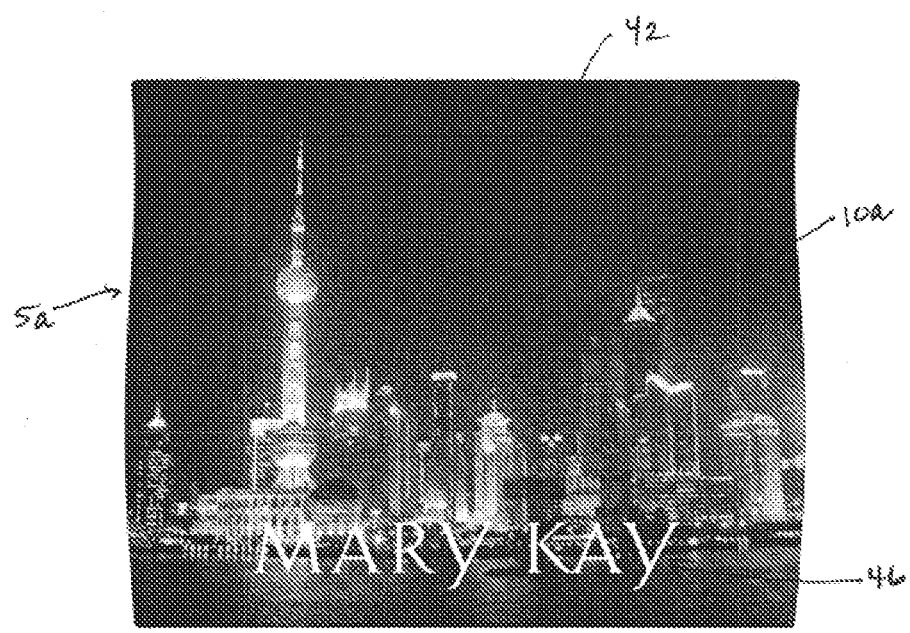
FIGS. 1A and 1B depict side and top views, respectively, of an embodiment of a cosmetic container having a customization component.
Figure 1A:
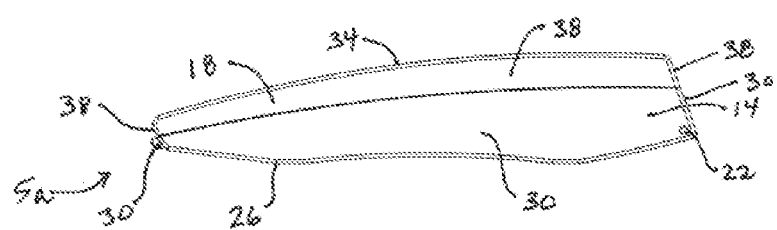
Figure 2B:
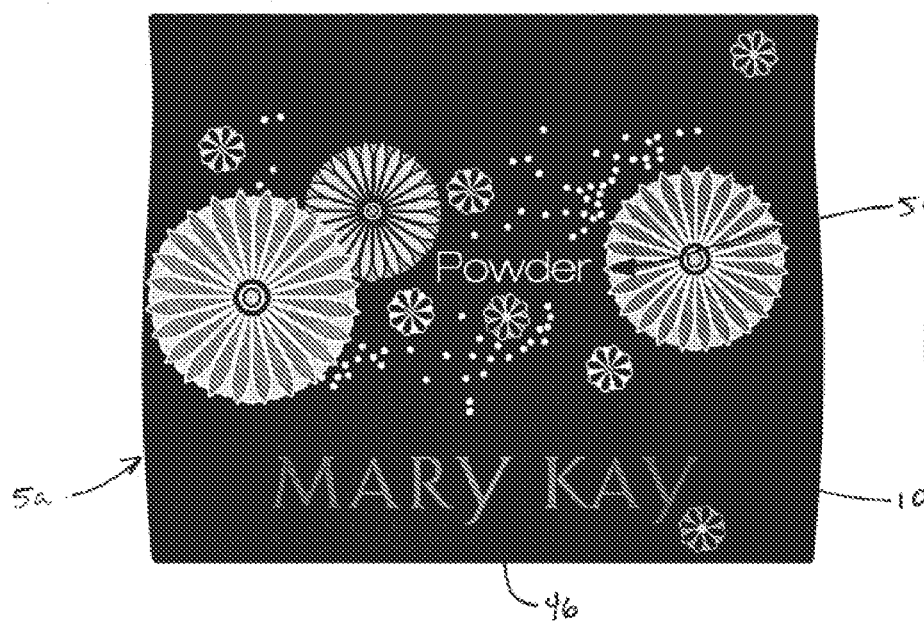
FIGS. 2A and 2B depict side and top views, respectively, of another embodiments of a cosmetic container having a customization component.
Figure 2A:
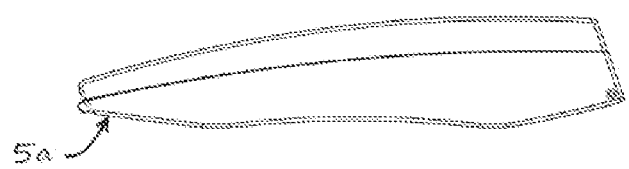

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art. Unless expressly limited "a portion" includes up to all of whatever it refers to.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those elements. For example, in an imaging system that comprises an imaging sensor module and a display, the imaging system includes the specified elements but is not limited to having only those elements. For example, such an imaging system could also include a central interface module coupled to the imaging sensor module and the display, such that images are received by the display from the imaging sensor module via the central interface module. Likewise, a method that "comprises," "has," "includes" or "contains" one or more steps possesses those one or more steps, but is not limited to possessing only those one or more steps.

Further, a device or structure that is configured in a certain way is configured in at least that way, but it can also be configured in other ways than those specifically described. A device or structure that is configured to be or do something has the capacity to be or do that something but need not (though it may) actually be or do that something. For example, a device or structure that is configured to be connected in a certain way need not actually be connected.

As used in this disclosure, a "cosmetic container" refers to an article of manufacture that is configured to contain and/or protect one or more cosmetic products over some portion of the useful life of the product. For example, such cosmetic containers can include compacts, lipsticks, mascara holders, tubes, bottles, applicator bottles, powder boxes, nail polish bottles, cosmetic pencils, fragrance bottles and vials, and the like. Such cosmetic containers may be sold within packaging such as boxes, shrink wrap, and the like, which may be discarded by a consumer after obtaining the cosmetic container.

Referring now to the drawings, and more particularly to FIGS. 1A-3B, shown therein is a cosmetic container 5*a* with a customization component 10*a* coupled to cosmetic container 5*a*. More particularly, in the embodiment shown, cosmetic container 5*a* is a compact comprising a body 14 defining a cavity (not shown, but see, e.g., cavity 78 in FIG. 10, and cavity 116 in FIG. 12) configured to receive a cosmetic product (e.g., one or more cosmetic products). As shown, body 14 is also configured to coupled to a lid 18 in a closed position (as shown) such that the body and the lid cooperate to substantially enclose the cavity. In the embodiment shown, the cosmetic container actually comprises a lid 18 that is pivotally connected to body 14 by way of a pin 22. In this way, the lid is pivotally connected to the body such that the lid can pivot relative to the body between the closed position (as shown) and an open position in which the cavity is accessible by a user. In other embodiments, a lid can be coupled to the body in any suitable fashion and/or by any suitable structure.

Cosmetic container 5*a* is further configured such that body 14 includes a bottom surface 26 and a sidewall 30 that is angularly disposed relative to bottom surface 26, and such that lid 18 includes a top surface 34 and a sidewall 38 that is angularly disposed relative to top surface 38. In the embodiment shown, sidewall 30 extends around the entire perimeter of the body (e.g., all four sides) and sidewall 38 extends around the entire perimeter of the lid (e.g., all four sides). In other embodiments sidewall 30 and/or sidewall 38 extend around only a portion of the perimeter of body 14 or lid 18, respectively (e.g., only three side, three sides and only a portion of the fourth side, or the like).

Customization component 10 is configured to be connected to at least one of body 14 and lid 18 such that at least a portion of the customization component contours to the shape of a surface of the at least one of the body and lid. In the embodiment shown, customization component 10 is a sticker or decal 10 that is configured to be coupled to top surface 34 of lid 18 such that sticker 10 substantially covers and contours to the shape of top surface 34. For example, sticker 10 has a shape that substantially matches the shape of top surface 34 (e.g., the outer perimeter of sticker 10 is substantially the same in shape and size, or is slightly smaller in size, than the outer perimeter of top surface 34. Sticker 10 can be configured to be coupled or connected to lid 18 in any suitable fashion. For example, sticker 10 can comprise a layer of adhesive (e.g., pressure-sensitive or heat-activated adhesive) that will permanently or temporarily stick sticker 10 to lid 18. By way of another example, sticker 10 can be a static-cling sticker such that when sticker 10 is placed in contact with top surface 34 of lid 18, pressed into place, static cling between the sticker 10 and top surface 34 will substantially hold the sticker in place. Static-cling stickers or stickers with temporary adhesive will be removable and/or interchangeable; they will be capable of being removed without difficulty and such that no adhesive (or an amount of adhesive that will not interfere with the placement or adhesion of a subsequent sticker or other customization component). In some embodiments of the present kits, cosmetic containers, and/or customization components, customization components are permanently coupled the cosmetic container and/or configured to be permanently coupled (e.g., connected) to the cosmetic container such that they cannot be removed without chemicals or cleaners, or without damaging the cosmetic container.

Figure 3B:
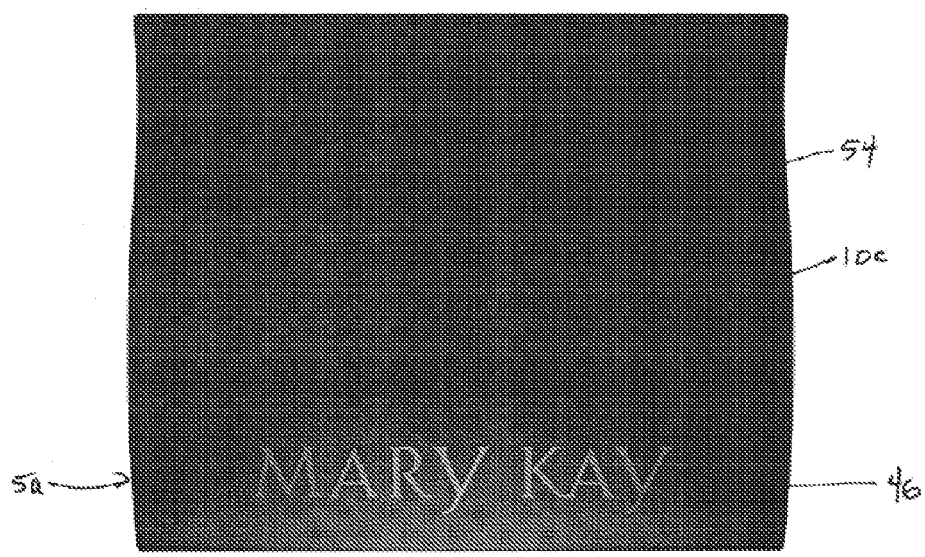
FIGS. 3A and 3B depict side and top views, respectively, of another embodiments of a cosmetic container having a customization component.
Figure 3A:
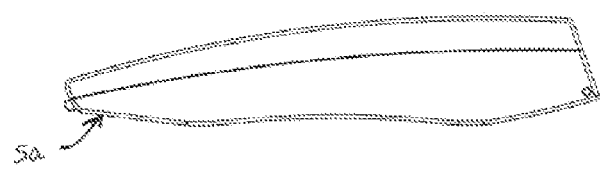

In the embodiment of FIG. 1B, sticker 10 comprises an image 42 and a company logo 46. In other embodiments, sticker 10 can comprise any suitable information, such as, for example, a product logo or product name 50 (FIG. 2B) or a basic background color or pattern 54 and a company logo or name 42 (FIG. 3B).

Some embodiments of the present kits comprise a cosmetic container and two or more customization components. One example of such a kit comprises a cosmetic container (compact) 5 and two or more stickers 10 (e.g., compact 5, sticker 10a, sticker 10b, and/or sticker 10c).

Some embodiments of the present kits comprise a cosmetic container 10a in which lid 18 is removably connected to body 14, and two or more customization components, where one or more (two or more, all, etc.) of the customization components are lids that are interchangeable with lid 18. Such lids can be the same shape and size as lid 18, and/or have different shapes, different colors, different patterns, or the like. In some embodiments, customization component lids can comprise one or more (e.g., selected from the group consisting of) transparent or translucent windows, mirrors, clocks, digital displays such as liquid-crystal displays, and/or the like. In some embodiments of the present kits, the body of the cosmetic container is configured to be coupled to a lid (e.g., in any fashion described in this disclosure) but the cosmetic container does not initially comprise a lid, and at least one (e.g., two or more, all) of the two or more customization components is a lid configured to be coupled to the body.

Although cosmetic container 5 is shown as a compact, in other embodiments of cosmetic containers can be or can comprise one or more of (e.g., selected from the group consisting of): compacts, lipstick containers, mascara containers, tubes, bottles, applicator bottles, powder boxes, nail polish bottles, and cosmetic pencil containers.

Figure 4A:
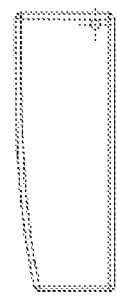
FIGS. 4A-4C depict various views of another embodiment of a cosmetic container for which customization components can be configured.
Figure 5B:
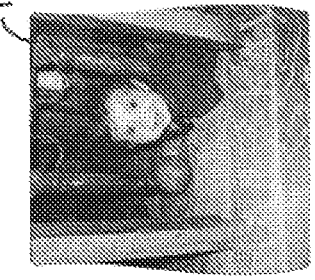
FIGS. 5A-5E depict various embodiments of customization components configured to be coupled to the cosmetic container of FIGS. 4A-4C.
Figure 4B:
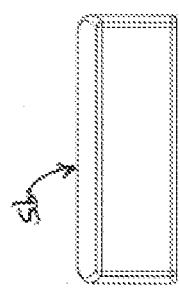
Figure 5C:
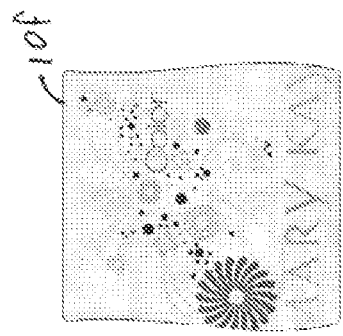
Figure 4C:
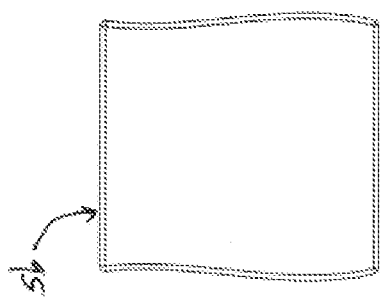
Figure 5D:
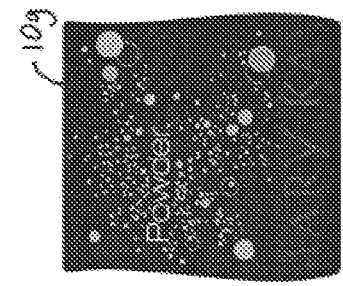
Figure 5A:
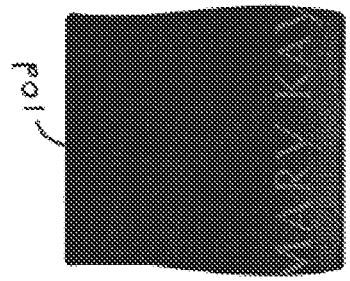
Figure 5E:
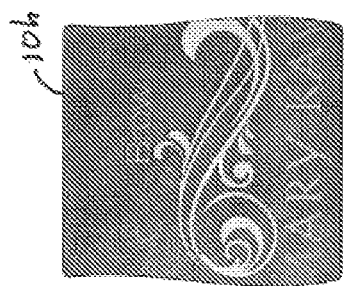

Referring now to FIGS. 4A-4C and 5A-5E, another embodiment of a cosmetic container (compact) 5b is depicted in FIGS. 4A-4C (side view in FIG. 4A, front view in FIG. 4B, top view in FIG. 4C) and various embodiments of customization components (stickers) 10d-10h are shown in FIGS. 5A-5E. Compact 5b is substantially similar to compact 5a described above with the exception that, when closed (e.g., in a closed position relative to the body), the sidewall of the lid substantially covers the sidewall of the body. Stickers 10d-10h are also substantially similar to stickers 10a-10c described above, with the primary exception that they are configured to correspond in size and shape to the size and shape of compact 5b. Additionally, and as shown in FIG. 5B, sticker 10e includes a photograph. Sticker 10e can be produced with a photograph sent in by or received from a consumer, or sticker 10e can be provided (e.g., in one of the present kits) in blank form such that a consumer can print a photograph on the sticker. Sticker 10e can, for example, be provided on a larger sheet such as a letter-size sheet or 3"×5" sheet that can be printed in a standard or photo-size printer, peeled from (e.g., if perforated or pre-scored) or cut out from the larger sheet, and applied to compact 5b.

Figure 6A:
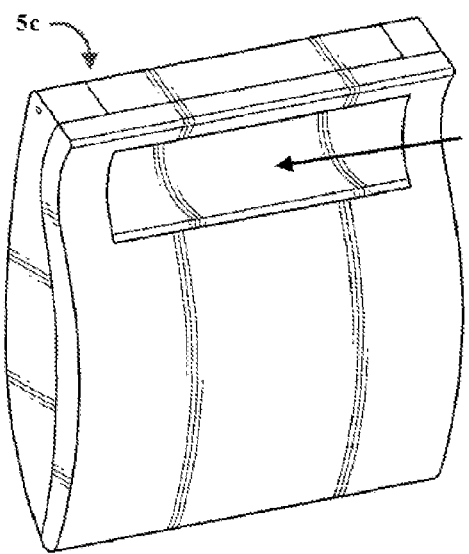
FIGS. 6A-6B depict a side view and top view of another embodiment of a cosmetic container for which customization components can be configured.
Figure 6B:
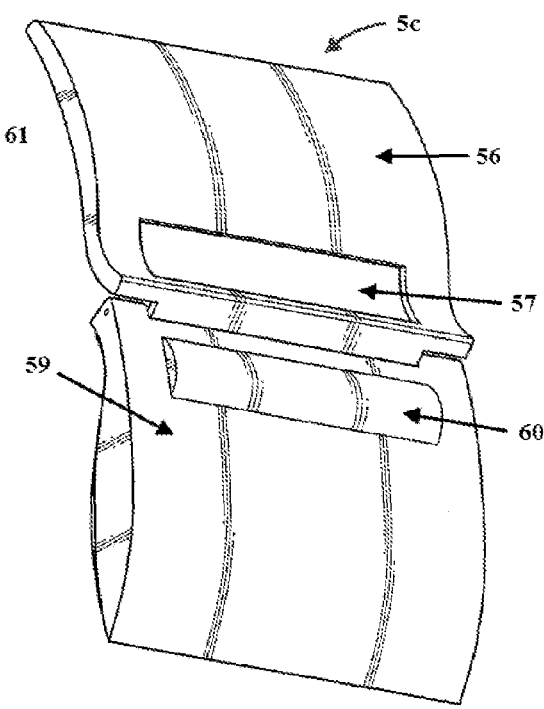
Figure 7A:
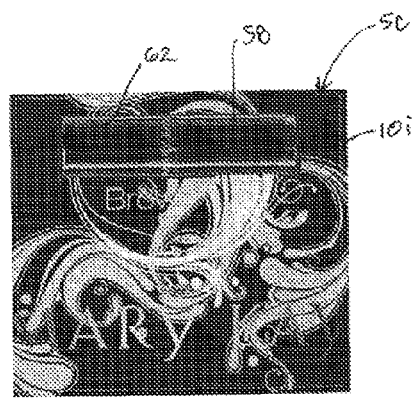
FIGS. 7A-7G depict various embodiments of customization components configured to be coupled to the cosmetic container of FIG. 6.
Figure 7B:
Figure 7C:
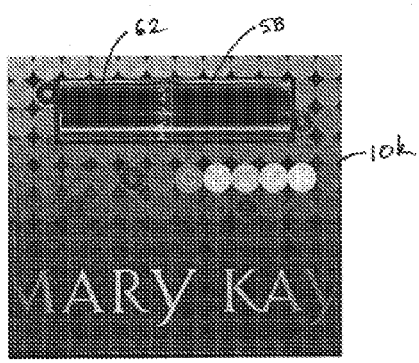
Figure 7D:
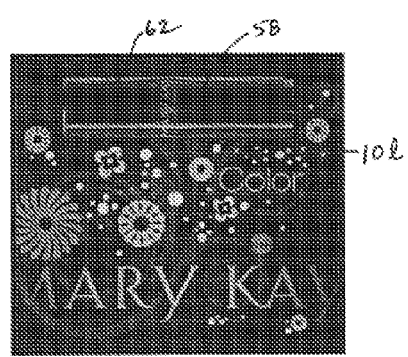
Figure 7E:
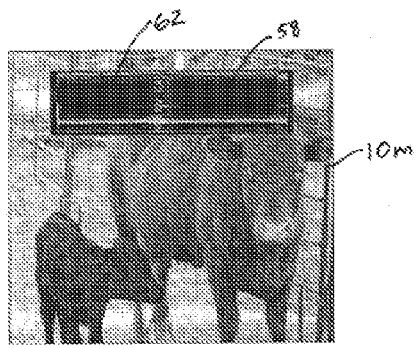
Figure 7F:
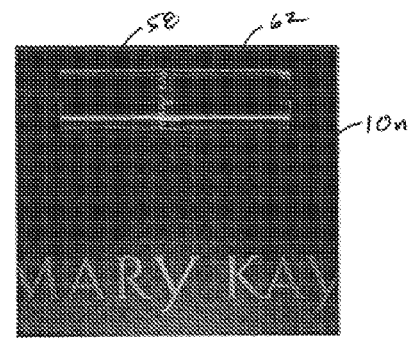
Figure 7G:
Figure 7G:
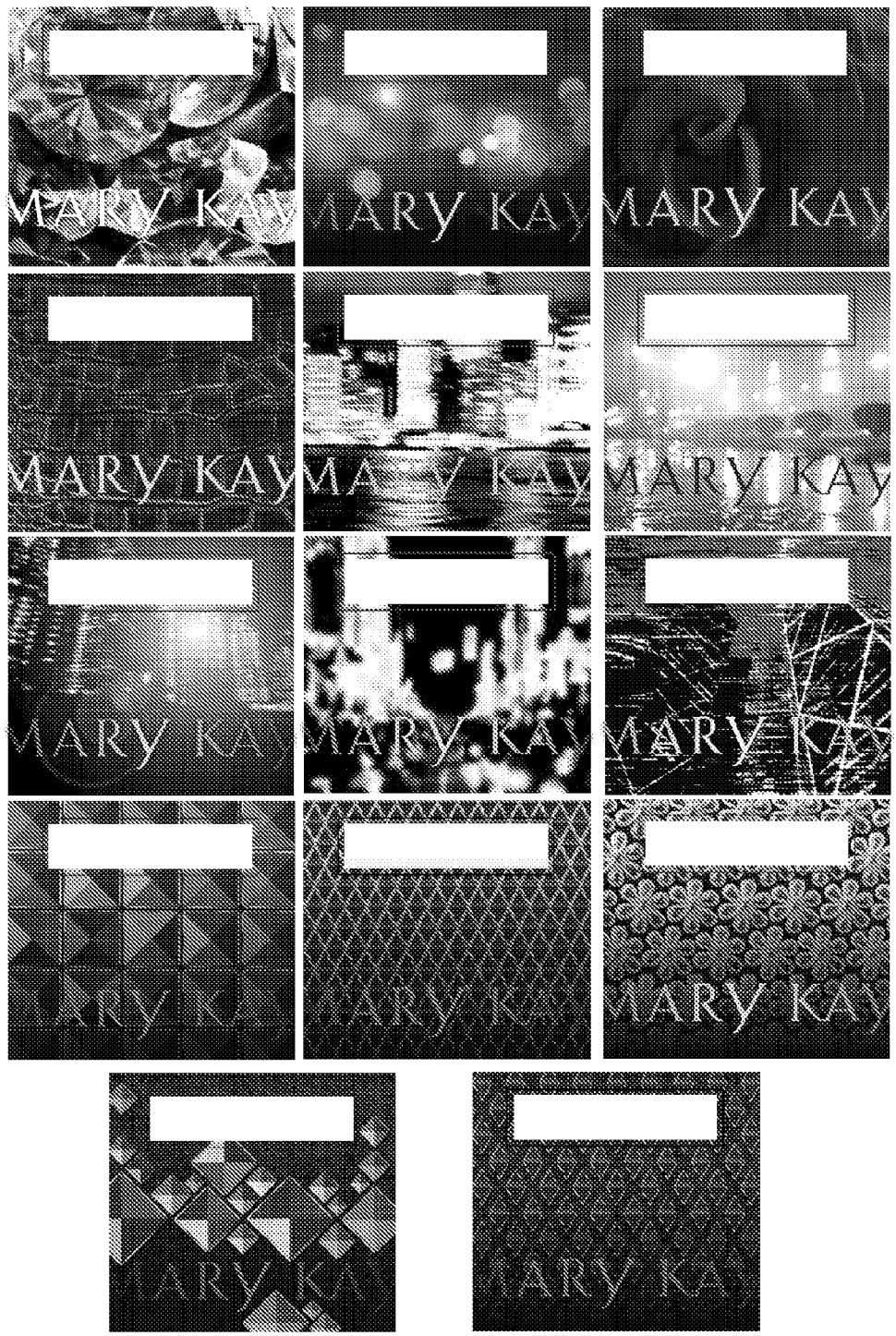

Referring now to FIGS. 6A-6B and 7A-7F, another embodiment of a cosmetic container (compact) 5c is depicted without customization components in FIGS. 6A-6B and with customization components in FIGS. 7A-7F. More particularly, in FIGS. 7A-7F, compact 5c is depicted with customization components 10i-10n. The lid 56 in compact 5c includes an aperture 57 that allows access to a lipstick case 58 from the top surface of the compact. The bottom surface of the container 59 of the compact 5c includes an elongated protrusion 60, which is formed from a well 61 that holds the lipstick case 58. As such, skins or stickers 10i-10n each includes an aperture or cutout 57 that allows the lipstick case 58 to be accessed from the compact or allows for the elongated protrusion 60 to extend through the skin or sticker 10i-10n. Illustrations of skins or stickers without the compact are provided in FIGS. 7G and 14A-C.

Figure 8A:
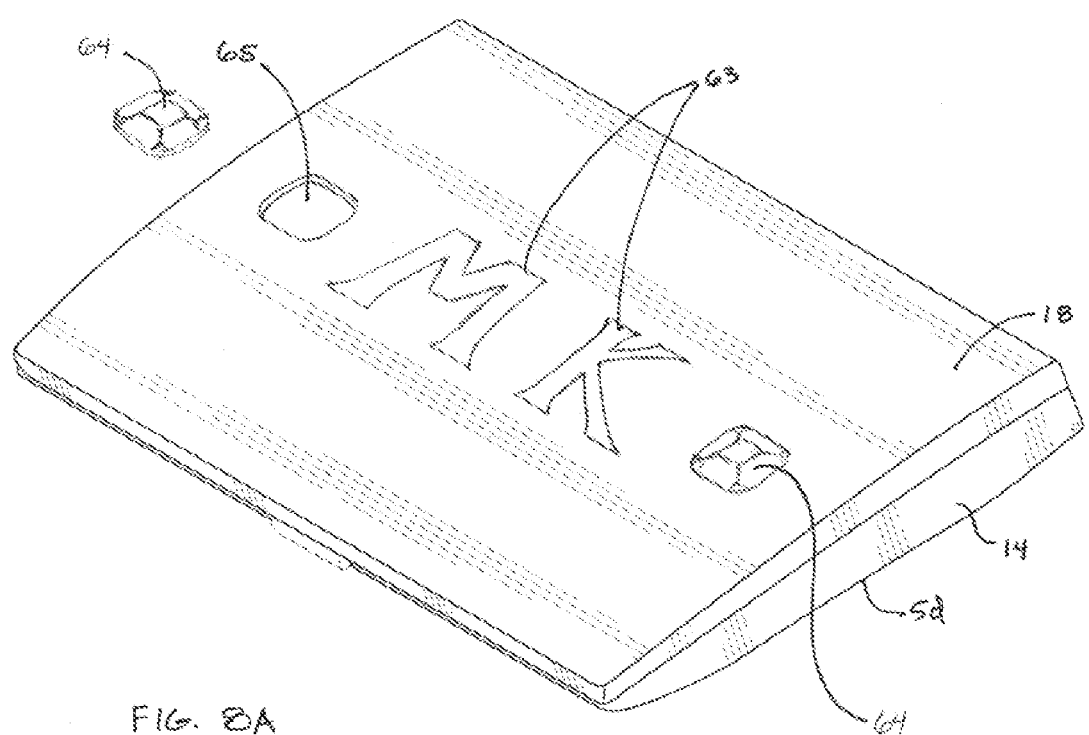
FIGS. 8A-8C depict various views of another embodiment of a cosmetic container for which customization components can be configured.
Figure 8B:
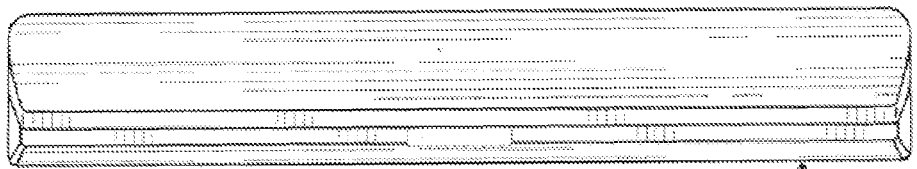
Figure 8C:
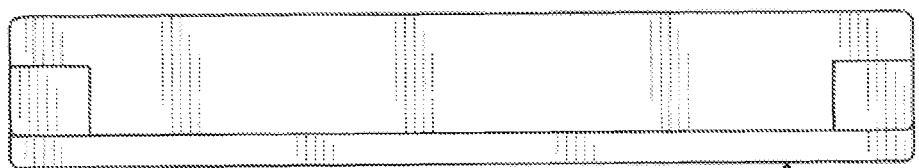
Figure 9A:
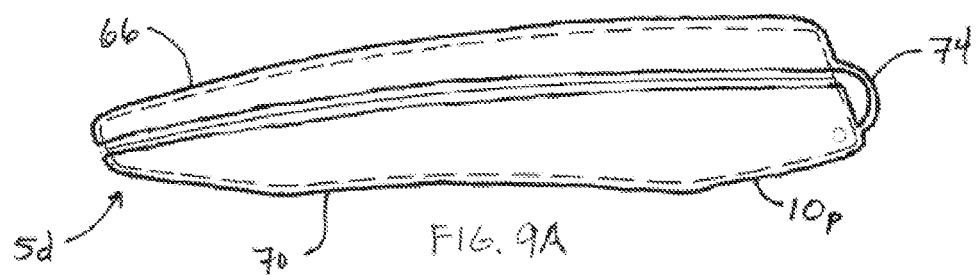
FIGS. 9A-9B depict side views of the cosmetic container of FIGS. 8A-8C with various embodiments of customization components coupled to the cosmetic container.
Figure 9B:
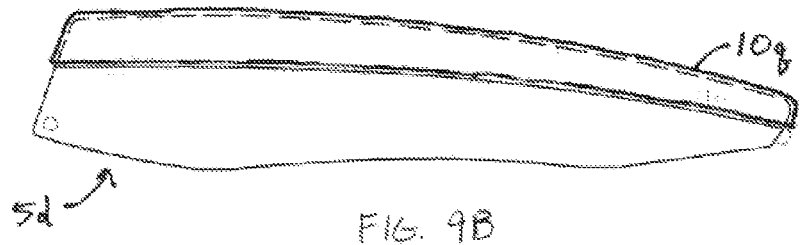

Referring now to FIGS. 8A-8C and 9A-9B, another embodiment of a cosmetic container 5d is shown without any customization components in FIGS. 8A-8C and with various embodiments of customization components in FIGS. 9A-9B. FIG. 8A depicts a perspective view of cosmetic container 5d, FIG. 8B depicts a front view of cosmetic container 5d, and FIG. 8C depicts a rear view of cosmetic container 5d. Cosmetic container (compact) 5d is substantially similar to cosmetic container 5a (e.g., cosmetic container 5d comprises a body 14 and a lid 18).

In the embodiment shown in FIG. 8A, compact 5d comprises several individual customization components. For example, compact 5d comprises a lid 18 that has been customized with engraving 63. In the embodiment shown, engraving 63 comprises two letters such as initials. Such engraving can be customized, for example, to comprise: first, last, and/or middle initial(s) of a customer; initials of the manufacturer of the cosmetic container or cosmetic contained in the cosmetic container, lettering for the name of a customer; lettering for the name of the manufacturer of the cosmetic container or cosmetic; initials or lettering for the name of a third-party entity such as for fund-raising, charity, or promotional purposes; symbols, patterns, line drawings (e.g., of a customer-submitted photograph); and/or any other lettering, symbols, patterns, or the like that a customer may wish to have engraved on a cosmetic container.

In the embodiment shown, compact 5d further comprises two insert accessories 64. More particularly, lid 18 of compact 5d comprises two recesses 65 configured to receive insert accessories 64. In some embodiments, each recess 65 can be configured to have a lip, prong, tab, or the like at or around its perimeter such that recess 65 is configured such that that insert accessories 64 removably snap into and/or out of the recess; and/or each insert accessory 64 can be configured to have a lip, prong, tab, or the like at or around its perimeter such that the insert accessory is configured to removably snap into and/or out of the recess. In other embodiments, neither recess 65 nor insert accessories 64 have tabs or the like, such that an insert accessory can be inserted into a recess 65 but must be affixed or retained in the recess 65 with adhesive, double-sided tape, or the like to prevent the insert accessory from falling out of the recess 65. As such, in some embodiments, when a customer orders a customizable cosmetic container with one or more recesses, and the customer selects one or more insert accessories corresponding to the recesses, the insert accessories are glued into the recesses (e.g., such that they are substantially non-removable) prior to shipping the cosmetic container (and/or cosmetic) to the customer. Insert accessories 64 can each comprise any suitable accessory, such as, for example, a jewel (e.g., plastic, glass, semi-precious or precious stones, or the like), a logo, an emblem, a photo holder, or the like. In some embodiments, a radio-frequency identification (RFID) tag can be inserted into recess 65 and/or under insert accessory 64.

FIG. 9A depicts compact 5*d* with a customization component 10*p*. More particularly, customization component 10*p* is shown as a customization skin 10*p*. Customization skin 10*p* comprises a resilient and/or flexible material, and is configured to be removably coupled to the body and the lid of compact 5*d* such that the customization skin fits over and around a portion of the body and a portion of the lid and remains coupled to the body and the lid without adhesive. Customization skin 10*p* can, for example, comprise silicone, polyurethane, fabric, rubber, polymers, and/or any other suitable flexible and/or resilient material. In some embodiments, the customization skin can also be configured to have some elasticity. In the embodiment shown, the customization skin is configured to be (and is) removably coupled to both the lid and the body such that the customization skin does not interfere with pivoting the lid relative to the body. In particular, customization skin 10*p* comprise an upper portion 66 configured to be coupled (and shown coupled) to the lid, a lower portion 70 configured to be coupled (and shown coupled) to the body of compact 5*d*, and a hinge portion 74 connecting the upper portion 66 and lower portion 70. Hinge portion 74 can be integral to (or separate from and connected to) upper portion 66 and lower portion 70, and is configured to be flexible such that it will not interfere with pivoting the lid relative to the body of compact 5*d*. In other embodiments, hinge portion 74 can be omitted such that the customization components comprise an upper skin and a lower skin.

FIG. 9B depicts compact 5*d* with a customization component 10*q*. Customization component 10*q* is also a customization skin 10*q*. Customization skin 10*q* is substantially similar to customization skin 10*p*, with the primary exception that customization skin 10*q* comprises only an upper portion 66 configured to be coupled to the lid of compact 5*d*. In other embodiments, customization skins can be configured to be coupled to only the body. In embodiments of customization skins configured to be coupled to compacts having a hinge portion (e.g., hinge portion 58 of compact 10*c*), the customization skins can include a cutout to permit the hinge portion to extend through the customization skin.

In other embodiments, customization components 10*p* and 10*q* can be cover shells configured to fit over and substantially cover a portion of at least one of the body and lid, such as, for example, in the manner shown in FIGS. 9A and 9B. In such embodiments, the cover shell can be configured to substantially retain its shape in the absence of an external force (e.g., can be partially or substantially rigid). Cover shells can comprise, metals such as steel or aluminum, polymers, fiberglass, carbon fiber, and/or the like.

Figure 10:
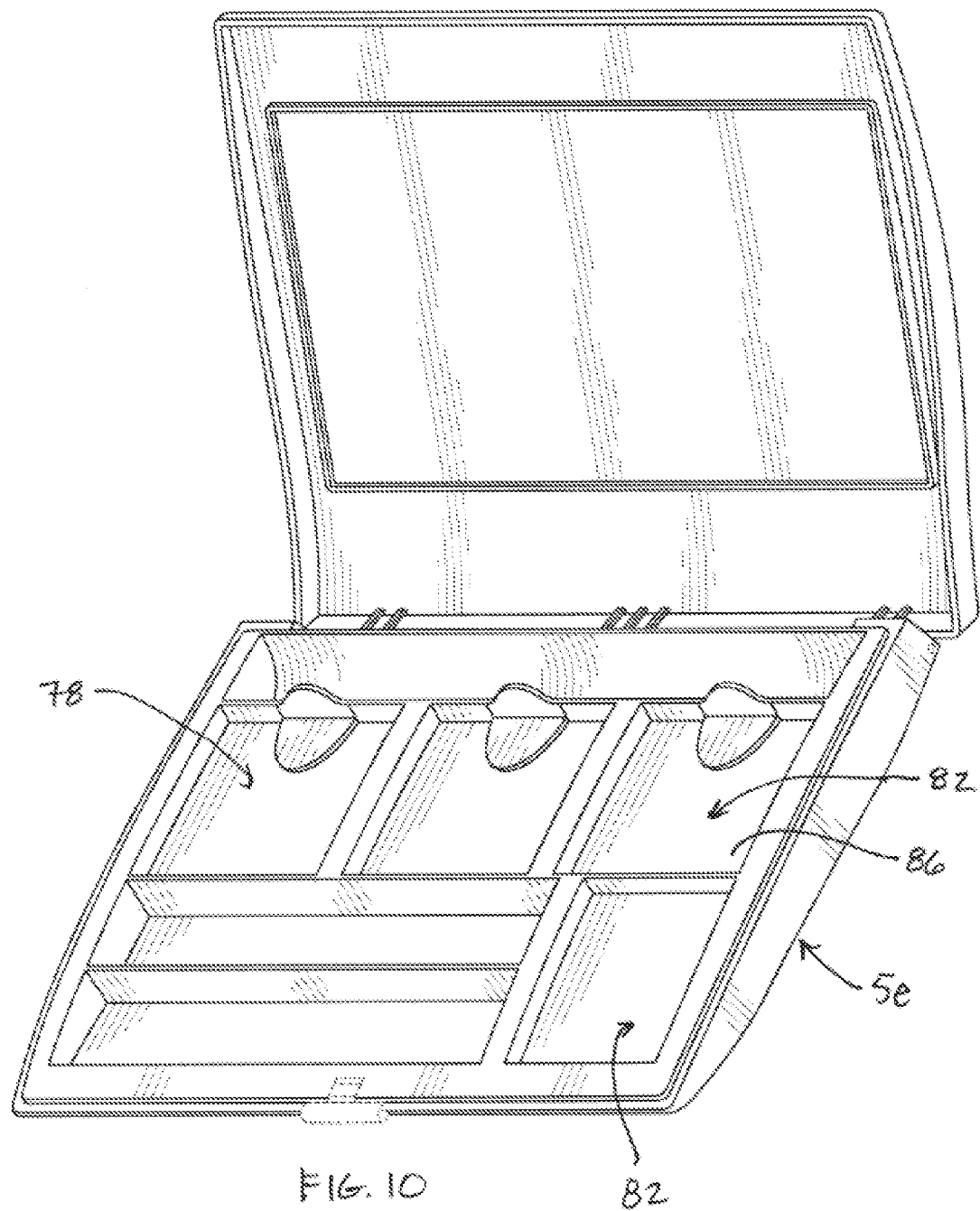
FIG. 10 depicts a perspective view of another embodiment of a cosmetic container for which customization components can be configured.

Referring now to FIG. 10, a perspective view is shown of another embodiment of a cosmetic container 5*e*. Externally, cosmetic container 5*e* is substantially similar to compact 5*a*. As with compact 5*a*, the body 14 of compact 5*e* defines a cavity 78 configured to receive a cosmetic product (e.g., one or more cosmetic products). More particularly, cavity 78 has a plurality of subcavities 82. In embodiments of the present kits comprising a cosmetic container 5*a*, and two or more customization components, at least one (e.g., two or more, all, etc.) of the customization components can be configured to fit within one or more subcavities 82. For example, customization components can include removable trays 86, pads or applicators, and/or any other suitable components. Another example of a customization component for cosmetic containers such as compacts is a mirror 90 that can be affixed to the interior and/or exterior of the lid and/or body of the cosmetic container. For example, mirror 90 can include a layer of adhesive, tabs, snaps, or any other suitable structure for coupling the mirror to a cosmetic container.

Figure 11:
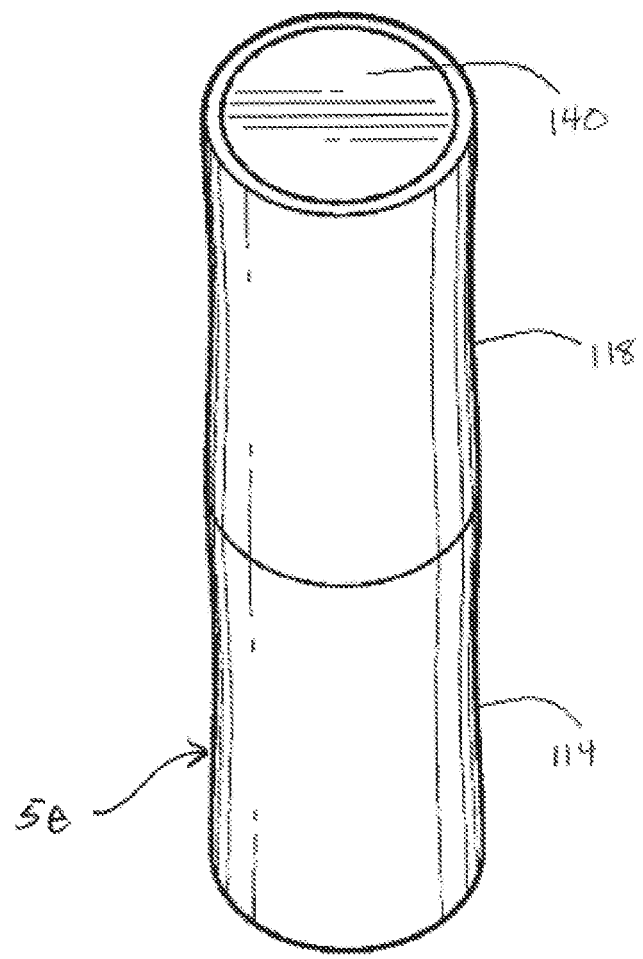
FIG. 11 depicts a perspective view of another embodiment of a cosmetic container for which customization components can be configured.
Figure 12:
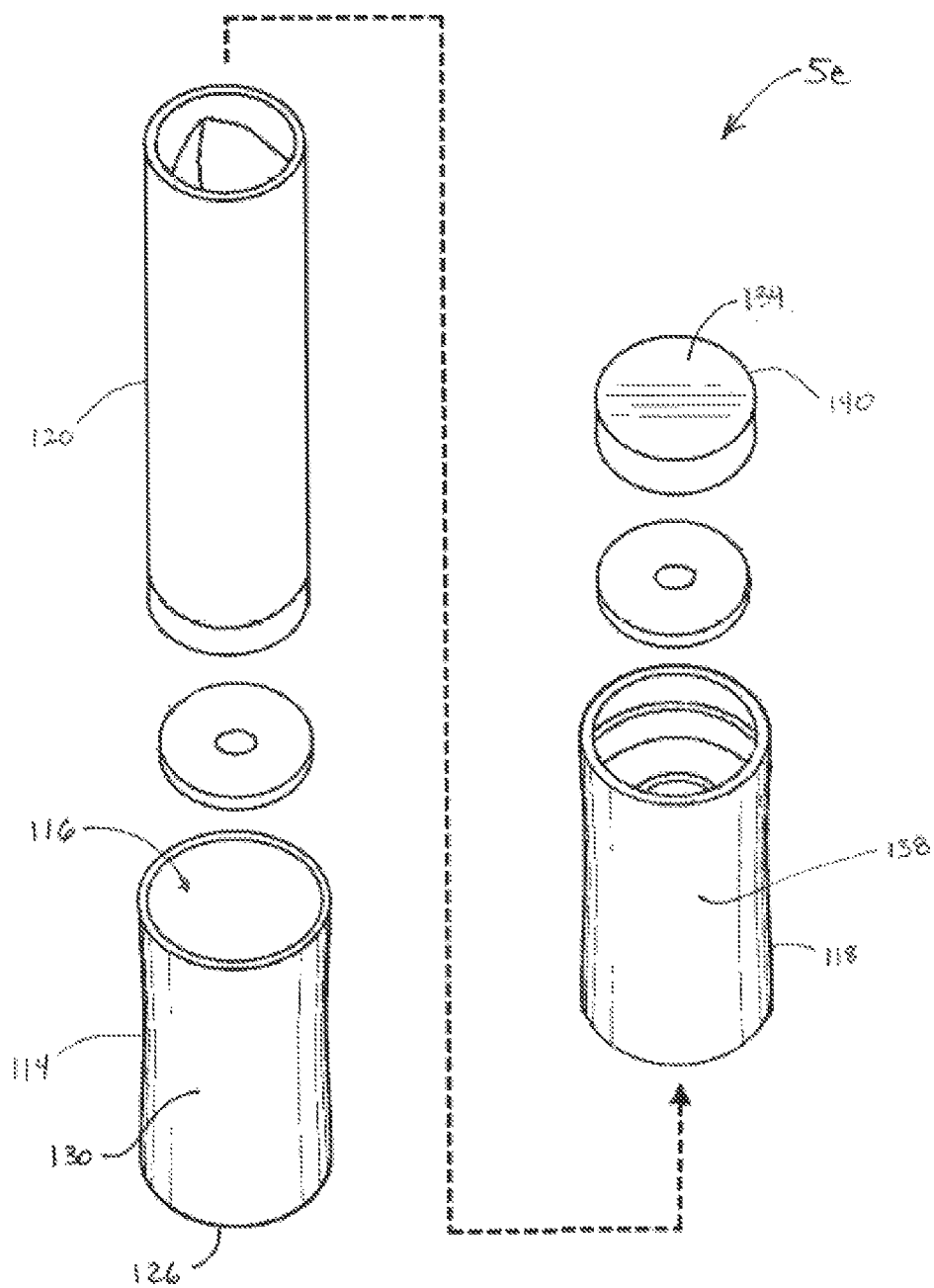
FIG. 12 depicts an exploded view of the cosmetic container of FIG. 11.

Referring now to FIGS. 11 and 12, another embodiment of a cosmetic container 5*f* is shown. Cosmetic container 5*e* is a lipstick container 5*f*. More particularly, lipstick container 5*f* comprises a body 114 defining a cavity 116 configured to receive a cosmetic product (e.g., lipstick 120). As shown, body 114 is also configured to coupled to a lid 118 in a closed position (as shown in FIG. 11) such that the body and the lid cooperate to substantially enclose the cavity. In the embodiment shown, the cosmetic container actually comprises a lid 118 that is configured to be removably coupled to body 114. As shown, body 114 comprises a lower surface 126 and sidewall 130, and lid 118 further comprises an upper surface 134 and sidewall 138. More particularly, upper surface 130 is defined by an insert 140 that can, for example, be configured to be removable. In this way, customization components for lipstick container 5*f* can comprise various versions (e.g., varying in color, pattern, texture, etc.) of components of the lipstick container, such as, for example, body 114, lid 118, insert 140, and/or any other components of the lipstick container.

In some embodiments, stickers and/or customization skins can be configured to fit around or on body 114 and/or lid 118. For example, a customization skin can comprise a tube with two open ends such that the customization skin can slide over and fit around the body or the lid while leaving exposed or uncovered lower surface 126 or upper surface 134, respectively. By way of another example, a customization skin can comprise a tube with a closed end and an open end. Such that the customization skin can slide over and fit around the body or the lid while enclosing or covering lower surface 126 or upper surface 134, respectively.

Referring now to FIG. 13, a webpage 200 is shown to illustrate several embodiments of the present methods. The webpage 200 includes an image of a cosmetic container 5*e* (e.g., having a body 114 and a lid 118), and two or more images each of a difference customization component. More particularly, in the embodiment shown, webpage 200 includes images of multiple customization components, such as, for example, a plurality of bodies 114*a*, 114*b*, 114*c* having different appearances (e.g., different colors, patterns, materials, and/or the like), a plurality of lids 118*a*, 118*b* (e.g., one solid lid 118*a*, one lid 118*b* having an opening adapted to receive interchangeable inserts (e.g., 140*a*, 140*b*, 140*c*), and a plurality of interchangeable or non-interchangeable (e.g., that can be permanently glued into lid 118*a*) inserts 140*a*, 140*b*, 140*c*. In this way, a user accessing webpage 200 can select a cosmetic container by clicking on the image of (or otherwise selecting or providing a user input corresponding to) a desired cosmetic container, and can select one or more customization components for the selected cosmetic container by clicking on the image of (or otherwise selecting or providing a user input corresponding to) the desired customization components.

Webpage 200 can, for example, be hosted on one or more servers such that webpage 200 can be accessible via the World Wide Web. In this way, a user or customer can access webpage 200 with a user device, such as, for example, a user device having a user display (e.g., an LCD screen and/or any other suitable display) and/or an input portion (e.g., a keyboard, a mouse, a touch screen, a stylus, and/or any other suitable input portion). Examples of suitable user devices include personal computers (PCs), personal digital assistants (PDAs), suitably configured cell phones, and/or any other suitably configured devices that permit a user to access the internet and/or otherwise shop remotely.

Figures 14A, 14B, 14C:
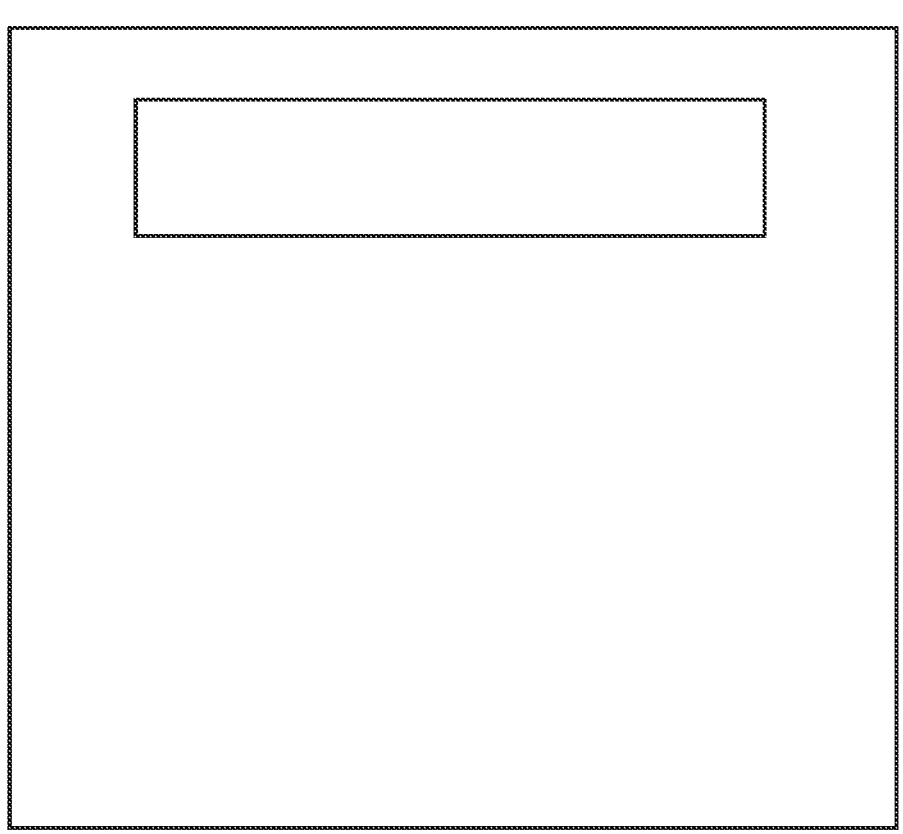
FIGS. 14A-C depict a customizable component that can be used to cover the top surface of a lid for a cosmetic compact that includes an aperture.

FIGS. 14A-14C concerns a customizable skin, adhesive sticker, or static-cling sticker that can be used on the lid of the compact illustrated in FIGS. 6-7. FIG. 14A is a top view (the bottom view being a mirror image). FIG. 14B is a front view (the back view being a mirror image). FIG. 14C is a right side view (the left side view being a mirror image). It is contemplated that FIGS. 14A-C can be used as a basis for a design application for the illustrated skin, adhesive sticker, or static cling sticker. The top surface of the skin, adhesive sticker, or static-cling sticker can have a reflective, dull, matted, or shinny appearance. While the skin, adhesive sticker, or static-cling sticker in FIGS. 14A-C have an opaque appearance, translucent or transparent appearances are also contemplated.

FIGS. 14A-14C concern a customizable skin, adhesive sticker, or static-cling sticker that can be used on the lid of the compact illustrated in FIGS. 6-7. Note that the skin, adhesive sticker, or static cling sticker has an aperture or cutout portion. FIG. 14A is a top view (the bottom view being a mirror image). FIG. 14B is a front view (the back view being a mirror image). FIG. 14C is a right side view (the left side view being a mirror image). It is contemplated that FIGS. 14A-C can be used as a basis for a design application for the illustrated skin, adhesive sticker, or static cling sticker. The top surface of the skin, adhesive sticker, or static-cling sticker can have a reflective, dull, matted, or shinny appearance. While the skin, adhesive sticker, or static-cling sticker in FIGS. 14A-C have an opaque appearance, translucent or transparent appearances are also contemplated.

Figures 15A, 15B, 15C:
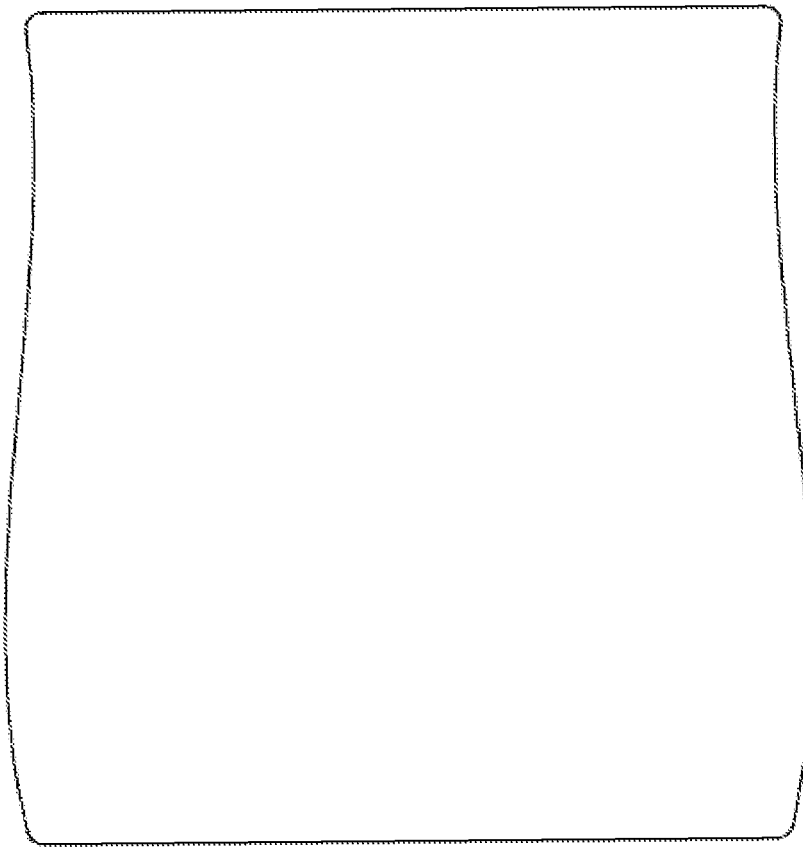
FIGS. 15A-C depict a customizable component that can be used to cover the top surface of a lid for a cosmetic compact.

FIGS. 15A-15C concern a customizable skin, adhesive sticker, or static-cling sticker that can be used on the lid of the compact illustrated in FIGS. 4A-4C. FIG. 15A is a top view (the bottom view being a mirror image). FIG. 15B is a front view (the back view being a mirror image). FIG. 15C is a right side view (the left side view being a mirror image). It is contemplated that FIGS. 15A-C can be used as a basis for a design application for the illustrated skin, adhesive sticker, or static cling sticker. The top surface of the skin, adhesive sticker, or static-cling sticker can have a reflective, dull, matted, or shinny appearance. While the skin, adhesive sticker, or static-cling sticker in FIGS. 15A-C have an opaque appearance, translucent or transparent appearances are also contemplated.

Figures 16A, 16B, 16C:
FIGS. 16A-C depict a customizable component that can be used to cover the top surface of a lid for a cosmetic compact.

FIGS. 16A-16C concerns a customizable skin, adhesive sticker, or static-cling sticker that can be used on the lid of the compact illustrated in FIGS. 1-3 and 8-10. FIG. 16A is a top view (the bottom view being a mirror image). FIG. 16B is a front view (the back view being a mirror image). FIG. 16C is a right side view (the left side view being a mirror image). It is contemplated that FIGS. 16A-C can be used as a basis for a design application for the illustrated skin, adhesive sticker, or static cling sticker. The top surface of the skin, adhesive sticker, or static-cling sticker can have a reflective, dull, matted, or shinny appearance. While the skin, adhesive sticker, or static-cling sticker in FIGS. 16A-C have an opaque appearance, translucent or transparent appearances are also contemplated.

In some embodiments of the present methods of distributing a customizable cosmetic container (e.g., cosmetic container 5e) over the internet, the method comprises: displaying via a user display at least one image of a cosmetic container comprising a body (e.g., body 14), the body defining a cavity configured to receive a cosmetic product, and the body configured to be coupled to a lid (e.g., lid 18) in a closed position such that the body and the lid cooperate to substantially enclose the cavity. In some embodiments, the method comprises: displaying via a user display at least one image of each of two or more customization components (e.g., body 114a, lid 118a, insert 140a, etc.), each customization component configured to be connected to at least one of the body and a lid such that at least a portion of the customization component contours to the shape of a surface of the at least one of the body and lid. In some embodiments, the method further comprises: receiving from a user one or more selection inputs each corresponding to a selected one of the two or more customization components; and shipping the cosmetic container and the one or more selected customization components to an address (e.g., a home address, business address, address of an intended gift recipient, etc.) designated by the user. The images displayed to the user need not be of the actual cosmetic container(s) and/or customization component(s) eventually shipped to the user, and instead, will generally be images of the same type of cosmetic container(s) and/or customization component(s).

In some embodiments, the cosmetic container(s) each include a cosmetic disposed within the cavity. In some embodiments, displaying via a user display at least one image of a cosmetic container comprises displaying at least one image of each of two or more cosmetic containers (e.g., displaying an image of a lipstick container and an image of a compact, such that a user can select the compact for customization, such as, for example, by clicking the image of the compact). In some embodiments the method further comprises receiving one or more selection inputs each correspond to a selected one of the two or more cosmetic containers (e.g., receiving one or more selection inputs from the input portion of the user device, such as, for example, a click on the image of a desired/selected cosmetic container); and shipping the cosmetic container comprises shipping the one or more selected cosmetic containers and the one or more selected customization components (e.g., shipping two or more cosmetic containers and two or more customization components). In some embodiments, the method comprises coupling a selected customization component to each cosmetic container prior to shipping. In some embodiments, coupling comprises permanently coupling a selected customization component to at least one cosmetic container.

In some embodiments of the present methods of ordering a customizable cosmetic container over the internet, the method comprises: accessing a website via user device having a user display and an input portion. In some embodiments, the method comprises: viewing via the user display at least one image of a cosmetic container (e.g., compact 5e) comprising a body (e.g., body 14), the body defining a cavity configured to receive a cosmetic product, and the body configured to be coupled to a lid (e.g., lid 18) in a closed position such that the body and the lid cooperate to substantially enclose the cavity. In some embodiments, the method comprises: viewing via the user display at least one image of each of two or more customization components (e.g., body 114a, lid 118a, insert 140a, etc.), each customization component configured to be connected to at least one of the body and a lid such that at least a portion of the customization component contours to the shape of a surface of the at least one of the body and lid. In some embodiments, the method comprises: entering via the input portion one or more selection inputs each corresponding to a selected one of the two or more customization components. In some embodiments, the method comprises: ordering the cosmetic container and the one or more selected customization components for shipment to an address (e.g., a home address, business address, address of an intended gift recipient, etc.)

that may be designated by the user and/or anyone performing the method. The images viewed need not be of the actual cosmetic container(s) and/or customization component(s) eventually shipped, and instead, will generally be images of the same type of cosmetic container(s) and/or customization component(s).

In some embodiments, the cosmetic container(s) each include a cosmetic disposed within the cavity. In some embodiments, viewing via a user display at least one image of a cosmetic container comprises viewing at least one image of each of two or more cosmetic containers (e.g., viewing an image of a lipstick container and an image of a compact, such that the compact can be selected for customization, such as, for example, by clicking the image of the compact). In some embodiments, the method comprises: entering via the input portion one or more selection inputs each corresponding to a selected one of the two or more customization components; where ordering the cosmetic container comprises ordering the one or more selected cosmetic containers and the one or more selected customization components (e.g., ordering two or more cosmetic containers and two or more customization components).

The foregoing examples, are not intended to be limiting. For example, in other embodiments, the cosmetic container can be or comprise one or more of (or can be selected from the group consisting of): mascara containers, tubes, bottles, applicator bottles, powder boxes, nail polish bottles, and cosmetic pencil containers. By way of another example, customization components can be or comprise one or more of (or can be selected from the group consisting of): skins, interchangeable lids (e.g., lids with different colors, textures, patterns, engravings, imprints, images, and/or the like), cover shells, labels, coatings, inserts, adhesive stickers, and static-cling stickers. Coatings can include, for example, removable or permanent paints (e.g., metallic or metallic-appearing paints), lacquers, and/or the like.

Any of the described cosmetic containers and customization components can be incorporated into the present kits. For example, embodiments of the present kits can comprise one or more (e.g., two, three, four, five, six, seven, eight, nine, ten, or more) cosmetic containers, and two or more customization components (e.g., a customization skin and a sticker, two, three, four, five, six, seven, eight, nine, ten, or more interchangeable customization skins, two, three, four, five, six, seven, eight, nine, ten, or more interchangeable lid inserts, or any other combination of the same and/or different customization components).

Similarly, any of the described cosmetic containers, customization components, and/or kits can be incorporated and/or used in the present methods. For example, on embodiment of the present methods comprises packaging one or more cosmetic containers and two or more (e.g., two, three, four, five, six, seven, eight, nine, ten, or more) customization components for distribution and/or sale. In another example of the present methods, one or more cosmetic containers are each coupled to one or more customization components to create customized cosmetic containers, and the customized cosmetic containers are then packaged for distribution and/or sale. In another example of the present methods, a cosmetic container and two or more customization components are received and/or provided, and one or more customization components are coupled to the cosmetic container.

Any embodiment discussed in this specification can be implemented with respect to any method, container, or system of the invention, and vice versa. Furthermore, containers and systems of the invention can be used to achieve methods of the invention.

Other objects, features and advantages of the present invention will become apparent from the above detailed description. It should be understood, however, that the detailed description, while indicating specific embodiments of the invention, are given by way of illustration only, since various changes and modifications within the spirit and scope of the invention will become apparent to those skilled in the art from this detailed description.

The invention claimed is:

1. A kit comprising:
a cosmetic container comprising a compact comprising a body, a lid, and a hinge portion, the body defining a cavity configured to receive a cosmetic product, the lid configured to be coupled to the body such in a closed position in which the body and the lid cooperate to substantially enclose the cavity, and where the lid is pivotally connected to the body by the hinge portion such that the lid can pivot relative to the body between the closed position and an open position in which the cavity is accessible by a user; and
a customization skin comprising a resilient, flexible material, the customization skin configured to be removably and interchangeably coupled to the body and the lid of the cosmetic container such that the customization skin fits over and around a portion of the body and a portion of the lid and remains coupled to the body and the lid through static-cling, without adhesive, where the customization skin does not interfere with pivoting the lid relative to the body, and where the customization skin comprises silicone.

2. The kit of claim 1, where the compact comprises a hinge portion projecting from a top surface of the compact, and where the customization skin includes a cutout to permit the hinge portion to extend through the customization skin.

3. The kit of claim 1, where the cosmetic container comprises a lipstick container and a second customization skin that includes a tube with a closed end and an open end such that the second customization skin is configured to be coupled to either a lid or base of the lipstick container.

4. A method for manufacturing a customizable cosmetic container, the method comprising:
displaying via a user display at least one image of at least one cosmetic container comprising a body, the body defining a cavity configured to receive a cosmetic product, and the body configured to be coupled to a lid in a closed position such that the body and the lid cooperate to substantially enclose the cavity;
receiving from a user at least one photograph, line drawing, pattern, symbol, and/or lettering;
displaying via a user display at least one image of one or more customization components, one or more of the customization components configured to be connected to the body and the lid such that at least a portion of the customization component contours to the shape of a surface of the body and a surface of the lid, wherein at least one of the displayed images incorporates the at least one photograph, line drawing, pattern, symbol, and/or lettering received from the user;
receiving from a user one or more selection inputs each corresponding to a selected one of the one or more customization components, wherein the user selected customization component incorporates at least one of the at least one photograph, line drawing, pattern, symbol, and/or lettering received from the user;

printing and/or engraving at least one of the at least one photograph, line drawing, pattern, symbol, and/or lettering selected by the user onto at least one customization component; and assembling the kit of claim 1 comprising the cosmetic container and the one or more selected customization components.

5. The method of claim 4, where the cosmetic container includes a cosmetic disposed within the cavity.

6. The method of claim 4, where displaying via a user display at least one image of at least one cosmetic container comprises displaying at least one image of each of two or more cosmetic containers.

7. The method of claim 6, further comprising:

receiving one or more selection inputs each correspond to a selected one of the two or more cosmetic containers;

where assembling the kit of claim 1 comprising the cosmetic container comprises including the one or more selected cosmetic containers and the one or more selected customization components in the kit.

8. The method of claim 4, further comprising coupling a selected customization component to the cosmetic container.

\* \* \* \* \*